(12) United States Patent
Cavegn et al.

(10) Patent No.: US 11,540,908 B2
(45) Date of Patent: *Jan. 3, 2023

(54) SINGLE- OR MULTI-UNIT DENTAL RESTORATION, AND METHOD OF PRODUCING THE SAME

(71) Applicant: Ivoclar Vivadent AG, Schaan (LI)

(72) Inventors: Nadja Cavegn, Planken (LI); Rudolf Jussel, Feldkirch-Gisingen (AT); Jörg Ebert, Buchs (CH)

(73) Assignee: Ivoclar Vivadent AG, Schaan (LI)

( * ) Notice: Subject to any disclaimer, the term of this patent is extended or adjusted under 35 U.S.C. 154(b) by 187 days.

This patent is subject to a terminal disclaimer.

(21) Appl. No.: 16/816,966

(22) Filed: Mar. 12, 2020

(65) Prior Publication Data

US 2020/0205945 A1 Jul. 2, 2020

Related U.S. Application Data

(63) Continuation of application No. 15/522,498, filed as application No. PCT/EP2015/075576 on Nov. 3, 2015, now Pat. No. 10,624,721.

(30) Foreign Application Priority Data

Nov. 4, 2014 (EP) ..................................... 14191615

(51) Int. Cl.
| | |
|---|---|
| *A61C 13/00* | (2006.01) |
| *A61C 13/083* | (2006.01) |
| *A61C 13/09* | (2006.01) |
| *A61C 13/275* | (2006.01) |
| *A61C 13/34* | (2006.01) |

(52) U.S. Cl.
CPC .......... *A61C 13/0013* (2013.01); *A61C 13/00* (2013.01); *A61C 13/083* (2013.01); *A61C 13/09* (2013.01); *A61C 13/34* (2013.01); *A61C 2013/2753* (2013.01)

(58) Field of Classification Search
CPC ... A61C 13/0013; A61C 13/00; A61C 13/083; A61C 13/09; A61C 13/34; A61C 2013/2753
See application file for complete search history.

(56) References Cited

U.S. PATENT DOCUMENTS

| | | | |
|---|---|---|---|
| 4,542,780 | A | 9/1985 | Bengt |
| 5,788,498 | A | 8/1998 | Wohlwend |
| 2012/0285019 | A1 | 11/2012 | Schechner et al. |
| 2014/0113251 | A1 | 4/2014 | Schweiger et al. |

FOREIGN PATENT DOCUMENTS

| | | |
|---|---|---|
| EP | 0943296 A1 | 9/1999 |
| WO | 9408783 A1 | 4/1994 |

*Primary Examiner* — Cynthia L Schaller
(74) *Attorney, Agent, or Firm* — Ann M. Knab; Thad McMurray

(57) ABSTRACT

The invention relates to a single- or multi-unit dental restoration, which consists of a support structure and a veneer, which support structure is in particular made from oxide ceramics by means of additive manufacturing, particularly preferably by means of rapid prototyping, wherein the veneer is produced by pressing a ceramic material, such as a glass ceramic or composite material, which is more translucent than the support structure, characterized in that the veneer fills and/or penetrates recesses of the support structure (12) configured as a net or frame structure or as a reinforcement, wherein it is particularly provided that the recesses penetrate through the support structure (12).

22 Claims, 3 Drawing Sheets

SINGLE- OR MULTI-UNIT DENTAL RESTORATION, AND METHOD OF PRODUCING THE SAME

CROSS-REFERENCE TO RELATED APPLICATIONS

This application is a continuation application of U.S. application Ser. No. 15/522,498, filed Apr. 27, 2017, which is the National Stage application of International patent application PCT/EP2015/075576 filed on Nov. 3, 2015, which claims priority to European patent application No. 14191615.5 filed on Nov. 4, 2014, all the disclosures of which are incorporated herein by reference in their entirety.

FIELD OF THE INVENTION

The invention relates to a single- or multi-unit dental restoration having a support structure and a veneer, which support structure can be made from oxide ceramics by means of additive manufacturing, such as by means of rapid prototyping, wherein the veneer is produced by pressing a ceramic material, such as a glass ceramic or composite material, which is more translucent than the support structure. The invention also relates to a method of producing a single- or multi-unit dental restoration, in which a veneer is produced by CAD design in such a manner that the CAD software initially constructs a support structure which is made from oxide or glass ceramic materials by additive manufacturing, such as by rapid prototyping, and that the veneer is produced in a method such as by means of muffle presses, from a glass ceramic material, which is more translucent than the oxide ceramic material.

BACKGROUND OF THE INVENTION

It has been known for long that dental restorations can be favorably built from several layers, wherein, in most cases, the color of the inner layer is kept more intensely colored and more opaque and the outer layer comprises a translucent design in order to optically approach natural teeth.

Here, the inner layer also serves to mechanically stabilize the dental restoration which, particularly with bridges, has to absorb the sometimes considerable masticatory forces which arise.

An example of an early solution for such a dental bridge made of a metal base and a ceramic or plastic cover can be taken from EP 94 615 A1.

In the subsequent years, the multi-layer technique was optimized further. Thus, EP 781 530 A2 from the present applicant already shows a ceramic—instead of a metallic—reinforcement element as a reinforcement. Optionally, it can also be provided with an attachment for compensating for deviations in length of the bridge and allows for a veneering with a ceramic mass.

While solutions are used readily, in which the reinforcement or the reinforcement element consists of metal or ceramics and the veneer of plastic, bridges with ceramic reinforcement elements—which optionally also comprise an attachment—and a ceramic veneer are considered to be comparatively difficult to produce. Typically, the reinforcement element is produced initially, and subsequently the veneer is produced while taking careful account of the desired outer shapes.

As the production of the difference shape, so to speak, is not uncritical and as variations and exceeded tolerances cannot be excluded, the opposite approach has also been suggested, namely that an outer shape, a so-called prefacet, is produced in a pre-fabricated manner and that the inner shape is then provided subsequently to this.

This solution is possible with crowns and veneers, however, it presents further difficulties in terms of the production of dental bridges.

SUMMARY OF THE INVENTION

Contrary to this, the invention is based on the task of providing a single- or multi-unit dental restoration having a support structure and a veneer, which support structure can be made from oxide ceramics by means of additive manufacturing, such as by means of rapid prototyping, wherein the veneer is produced by pressing a ceramic material, such as a glass ceramic or composite material, which is more translucent than the support structure and a corresponding method of producing the same in which a veneer is produced by CAD design in such a manner that the CAD software initially constructs a support structure which is made from oxide or glass ceramic materials by additive manufacturing, such as by rapid prototyping, and that the veneer is produced in a method such as by means of muffle presses, from a glass ceramic material, which is more translucent than the oxide ceramic material, which restoration and process are improved in terms of producibility, mechanical strength and also aesthetics.

This task is inventively solved by claim 1. Advantageous developments may be taken from the subclaims.

According to the invention, instead of the class-specific state of the art comprising the reinforcement element a specific structure is provided which surprisingly solves the problems of the state of the art, namely a net or frame structure with recesses therein, and finely structured struts which extend transversely to one another with several branches and which produce the recesses therebetween.

Surprisingly, the inventive finely structured support structure, which forms a large-area connection with the veneer, produces a considerably improved ratio between strength and volume, which is considerably better than the sum of the strengths of the individual components in any case. In the realization of bridges, the inventive structure extends between the abutment teeth to be bridged.

In an advantageous development it is provided that the bridge link or the bridge links in the support structure are configured as disc-shaped enlargements of the interdental connectors from a labial or buccal view and that in the area of these enlargements the recesses are realized which in particular also extend in the cervical direction and/or in the lingual direction openly. This results in a net structure and the load carrying capability of the dental restoration is still further improved compared to the input of material.

It is further particularly favorable if the veneer is produced from a positive model which is embedded in a muffle, said positive model being completely burnt out in a thermal process. The produced cavity is subsequently filled by pressing or casting.

The support structure is constructed by taking into account the physiological masticatory forces and is particularly reduced to a minimum level of the required material requirement. For this purpose, in an inventively preferred embodiment, the exact arrangement of the frame or net structure is calculated and determined by CAD, in particular according to the finite element method. The inventive finely structured frame structure can also partially comprise at least a tree structure and/or a honeycomb structure.

According to the invention, it is also particularly favorable that a load-dependent reinforcement is possible easily such that the support structure provides an intensively structured and more strongly developed frame structure specifically at particularly loaded positions according to bionic aspects.

Due to its finely structured branching, it is required to produce the support structure by additive manufacturing. Here, stereo lithography has proven to be particularly suitable; the production accuracy can be at, for instance, 50 μm. Here, photopolymerizable slurries filled with a ceramic material are used particularly preferably. The components produced in this way are debound and densely sintered in a thermal post processing. The ceramic support structure with net-shaped or frame-shaped cavities produced in this way is filled with a glass ceramic press ceramic material finally.

If the ceramic support structure is constructed by additive manufacturing, the slurry should be filled with fillers. These fillers can be oxide or glass ceramic particles comprising a particle size of up to 50 μm.

Alternatively, the support structure—e.g. produced by additive manufacturing—can be embedded as an individual positive model, wherein after hardening of the embedding material it can be burnt out without leaving residues. Then, the cavity produced in this way is either filled with metal in a casting process or with a glass ceramic material in a pressing process, and in this way the support structure is formed. In this alternative, unfilled material is used for the positive model of the support structure.

When constructing the frame-type support structure it is to be understood that the distribution of forces is inventively optimized by adapting the structure to the directions of main loading. It is known that ceramic materials are significantly more pressure resistant than tension-proof, and this is taken into account when realizing the design of the support structure. The maximum loads to be expected are basically incorporated into the calculation of the support structure; however, the support structure is designed such that it absorbs the existing maximum loads with the provided safety margin only in combination with the veneer or the envelope ceramic material and upon embedding therein. Subcritical areas are consciously provided with additional recesses, thus reducing the mass of the oxide ceramic material.

A further advantage of the inventive realization of a finely structured net structure as a support structure is the facilitated and faster debinding process, as only smaller volumes of the support structure exist. In this way, the support structure can be debound within 3 to 4 hours and sintered within 1 to 2 hours.

According to the invention, this structure is employed such that it penetrates the ceramic material of the veneer, that is to say penetrates into the recesses thereat, however, said structure not extending to the surface but, for instance, keeping a distance of 1.5 or 2 mm towards the surface of the restoration. By means of the intensive penetration between the structured ceramic support and the veneer, not only a good connection occurs between the two, as the connection surface, that is to say the entire surface at which the support structure and the veneer lie flat against each other, is considerably enlarged compared to the prior art, for instance three times as large or even up to ten times as large.

As the boundary surfaces do not always extend radially to the outside but into numerous different directions, the danger that the ceramic materials detach from one another due to different coefficients of thermal expansion is much lower: The ceramic veneer which comprises a lower fracture strength than the support structure remains in secure connected contact with the ceramic material of the frame structure, as the ceramic materials support each other in all spatial directions and are connected with each other.

The recesses or cavities in the net or frame structure of the ceramic support are filled with the ceramic veneer and support it at the same time such that it is surprisingly uncritical if the mechanic strength of the ceramic support alone—that is to say without application of the ceramic veneer—is not sufficient as such for the load which is to be carried in practice.

Contrary to this, it is rather provided according to the invention that the strength of the ceramic support results in the desired final strength when firing it together with the ceramic veneer.

Surprisingly, this measure also offers the possibility of considerably reducing the mass of the ceramic support, which is favorable for the aesthetics of the entire dental restoration. The tendency of the support structure to shine through the ceramic veneer is practically eliminated inventively such that the use of opaques or the like is superfluous in any case.

In an advantageous embodiment, the support structure is produced by RPT. In particular, when the stereo lithography technique is used, very finely structured structures can also be produced; preferably from slurry which is debound and densely sintered. Other RPT techniques are also possible.

The net-shaped or frame-shaped cavities produced in this way are filled with a press ceramic material in a way known per se, wherein a glass ceramic material is preferred. Here, lithium disilicate, ceramels or feldspar ceramic materials can be employed or any other materials suitable for pressing.

After completion of the framework ceramic, it is used as a base for shaping the outer shape of the dental restoration. The dental restoration is modeled in plastic or wax in the desired manner. Sprueing, that is to say providing a feeder to the press cavity, takes place preferably in the more massive areas of the dental restoration, optionally at an oblique angle to the side outside of the area of the support structure such that it forms influx resistances which are as low as possible when the soft press ceramic for the veneer flows in later.

Preferably, the flow direction is selected such that it is directed along the main direction of extension of the struts of the net structure such that they form a flow resistance which is as low as possible.

After having embedded the fully modeled outer shape of the dental structure and after the embedding material has cured, the plastic or wax mass corresponding to the veneer is burnt out, and the ceramic veneer is pressed into the remaining mold cavity at a low flow rate.

Surprisingly, according to the invention a more accurate outer shape is achieved after the usual cooling process compared to a massive reinforcement element.

In order to be able to fix the support structure in the muffle in the pressing through process, additional fixation lands or projections are preferably provided which are not provided in the visible area of the restorations and which are removed after the pressing through process with the ceramic veneer.

In a further advantageous embodiment, it is also possible to use one or more pre-fabricated standard components which are suitable for the provision of the desired bridge in terms of their dimensions. This component can also be pressed through with the ceramic veneer mass such that the ceramic veneer penetrates into all of the cavities and recesses of the ceramic support.

The veneer consists of a glass ceramic material. Apart from feldspar ceramics, lithium disilicate ceramics are particularly suitable. However, it is also possible to use a composite or any other plastic material suitable for this purpose.

The veneer determines the outer contour of the dental restoration. It penetrates through the recesses in the support structure. Apart from an improvement of aesthetics by means of the translucent veneer, the veneer also has a strength-increasing function; the contact surface to the support structure is considerably increased by means of its fine structure.

In a further advantageous embodiment, it is provided that the cavity for the veneer is filled with a glass ceramic material in a press process, wherein the material for the support structure comprises a higher strength than the material for the veneer, and wherein the veneer is produced by pressing a glass ceramic or composite material which is more translucent than the glass ceramic material of the support structure.

The support structure preferably consists of an oxide ceramic material such as zirconium dioxide. It is produced by additive manufacturing, for instance by rapid prototyping. However, it is also possible to use individual or assembled elements of the support structure which have already been pre-fabricated, and to incorporate them therein.

Instead of the realization of a support structure made of an oxide ceramic material it is also possible to use a finely structured fine framework which is, for instance, produced by means of a casting technique and which is veneered with an opaquer in a way known per se.

Preferably, the positive model of the veneer is constructed by additive manufacturing on the basis of the completed support structure, for instance made from a plastic material which can be burnt out. This plastic material penetrates the recesses in the support structure which has already been completed and surrounds it, wherein the outer shape corresponds to the actual outer contour which is to be realized later in effect.

The veneer which is produced by the additive manufacturing process, for instance by rapid prototyping, which penetrates the recess in the support structure, and surrounds the support structure, and which is still present as a plastic mold as a positive model, is sprued subsequently, if necessary, that is to say it is provided with a press channel which extends to the muffle mandrel and which is subsequently embedded into an extremely temperature resistant embedding material.

After the embedding mass has cured, this plastic mold is completely burnt out in a way known per se, and in the concluding step, in a hot pressing process, the resulting cavity between the cured embedding mass and the support structure is pressed by means of the material used for the veneer.

When determining the outer shape of the support structure and thus of the veneer it is taken into account by CAD that aesthetic aspects are particularly relevant. If, for instance, the support structure extends relatively close to the outer and thus visible areas of the veneer, for reasons of an optimized strength, it is also possible to use comparatively translucent material for the support structure at least at this position, or, for instance, to use an opaque when realizing the support structure from metal.

At the abutment teeth, the dental restoration comprises copings in a way known per se, which form aprons which extend at the labial/buccal side on the one hand and the lingual side on the other hand in the cervical direction and which run out in a rounded fashion. The longitudinal extension of the aprons is tilted to such an extent that the axis of the apron points away from the bridge in the cervical direction and towards the bridge in the incisal/occlusal direction.

The axial inclination of the aprons amounts to between 8° and 30°, in particular between 10° and 25° compared to a vertical line relative to the occlusal plane.

Preferably, it is provided that the ceramic support is produced based on the calculated distribution of forces of the bridge by reducing the used masses as much as possible, wherein in particular the individual struts of the ceramic support have a length/thickness ratio of more than 3 to 1, in particular more than 5 to 1.

Preferably, the shape for the ceramic support is produced by means of a CAD software by CAD design which automatically provides at least one sprue channel for the ceramic support which extends at an angle of between 45° and 60° relative to the occlusal plane and which ends adjacent to the thickest area of the ceramic support (12) in a way known per se.

According to the invention, it is particularly favorable that the frame structure can be realized according to bionic aspects and, surprisingly, problems in terms of shrinkage can be avoided. The structures produced in this way are complex and allow for an improved form stability.

In a further preferred embodiment filaments or bars made of an oxide ceramic material of the type of fiber-reinforced plastic are provided which extend obliquely and transversely and in particular also bent through the bridge structure. Tests have shown that this considerably improves the stability and resistance of the bridge.

Due to the inventive finely-structured arrangement the different thermal expansion coefficients of zirconium dioxide and lithium disilicate (10.5 compared to 9.5 to 9.8/µK°) are uncritical, and liability is ensured reliably even without specific measures.

In an advantageous embodiment, in the realization of the design of the support structure, the shape of the recesses is also a parameter which can be optimized. Of course, the shape of the recess is associated with the shape of the struts of the frame structure. Preferably, they also extend longitudinally and ovally in the direction of the direction of the main forces, in fact with a low ratio of length/width of between 1 to 1 and 10 to 1, preferably 3 to 1. A longitudinal and oval embodiment of the recesses automatically results in a thickening of the struts at the knots, which is also favorable for the transmission of forces.

The realization of knots or joints of the frame and/or net structure leads to an improvement of the inherent stiffness of the ceramic support. When realizing the support structure by individual fibers the function of the knot is taken over automatically by the close vicinity of crossing fibers at their transitions, wherein the transmission of forces at the knots will then take place via the filling ceramic material or the veneer.

In this case, too, the close connection between the filling ceramic material and the ceramic support is advantageous which is ensured by a correspondingly micro-structured surface of the ceramic support.

BRIEF DESCRIPTION OF THE DRAWINGS

Further advantages, details and features may be taken from the following description of several exemplary embodiments of the invention in conjunction with the drawings, in which:

FIG. 3b shows a section along the line A-A from FIG. 3a;

DETAILED DESCRIPTION

Figure 1:
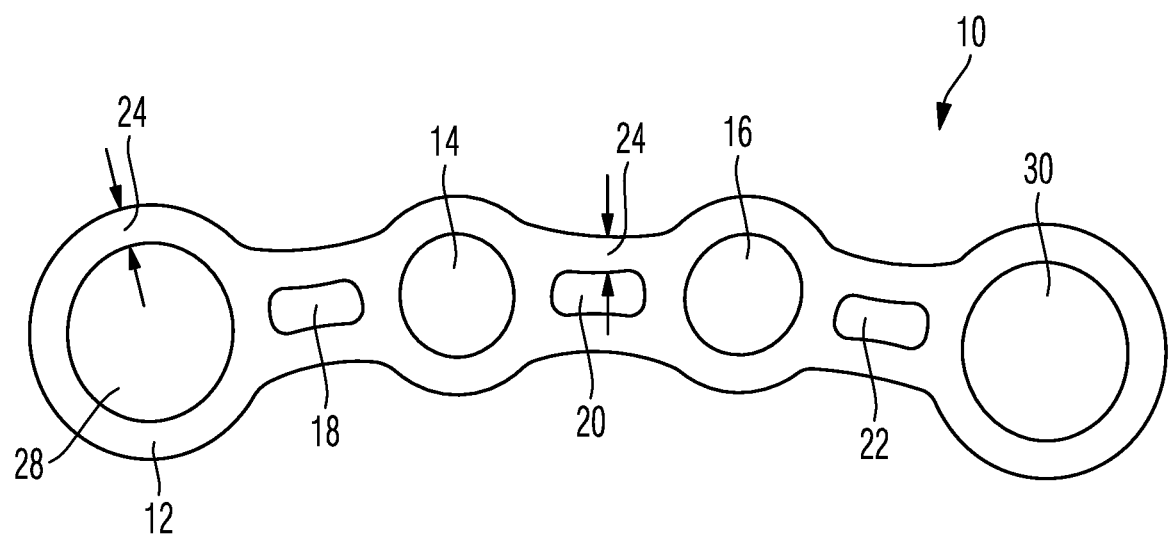
FIG. 1 shows a schematic view of an inventive dental restoration showing the ceramic support of a bridge, in a bottom view.

The dental restoration 10 illustrated in FIG. 1 is configured as a bridge and comprises the ceramic support 12 apparent from FIG. 1. This ceramic support 12 is configured as a net or frame structure in the broadest sense, wherein the simplified view is due to the graphic illustration and, in fact, can be much more complex and finely structured in practice. Preferably, the ceramic support 12 is an oxide ceramic material, but can also be a glass ceramic material with a higher strength than the veneer.

In the exemplary embodiment illustrated, the support structure 12 comprises two round recesses 14 and 16 in any case, which are allocated to the bridge teeth and which are open cervically. The recesses 14 and 16 run conically—as can be seen from FIG. 2—and are rounded at the incisal/occlusal end surface.

Further recesses 18, 20 and 22 extend between them and next to them, which recesses are related to the bridge units provided thereat, and are also open cervically.

The ceramic support 12 according to FIG. 1 is constructed such that it has a constant wall thickness of 1.5 mm. It has become evident that the thin wall thickness is decisive to accelerate the debinding process such that in the construction illustrated debinding is possible within 8 hours.

It is to be understood that the wall thickness 24 in the embodiment according to FIG. 1 can still be reduced considerably, for instance to between 0.6 mm and 0.8 mm, leading to a correspondingly reduced debinding time.

Veneer recesses 28 and 30 are allocated to the abutment teeth of the dental restoration and serve to be attached to the tooth stump located thereat in a way known per se.

The ceramic support is embedded completely into a veneer or ceramic veneer. This predetermines the outer shape in particular at the occlusal surface of the dental restoration and also fills the recesses 14 to 22, while the veneer recesses 28 and 30 are preferably only lined with the ceramic veneer in order to ensure a slightly less hard mounting of the dental restoration to the respective related tooth stump.

An anatomically favorable mounting is of importance to keep the wear of the antagonist as small as possible and to bring the chewing sensation of the dental restoration closer to the natural chewing sensation.

Figure 2:
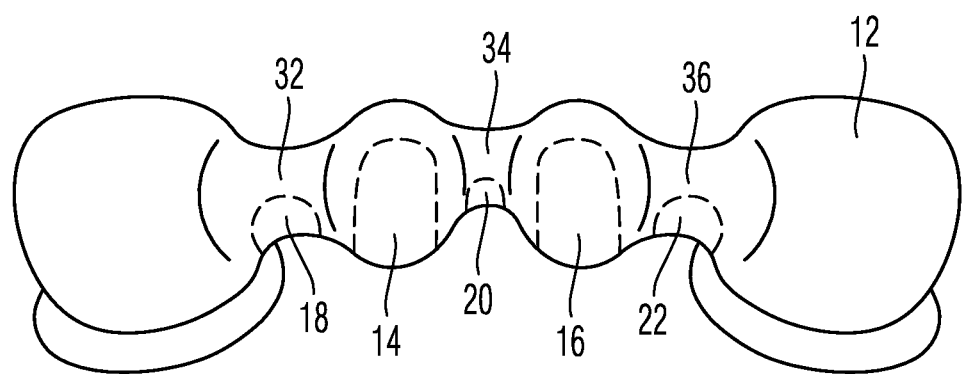
FIG. 2 shows a schematic perspective side view of the ceramic support of the bridge according to FIG. 1.

FIG. 2 illustrates that all the recesses 14 to 22 extend towards the bottom, that is to say in the cervical direction, in a slightly conically widened manner. This facilitates and improves the pressing of the filling ceramic material into the recesses.

In a way known per se, the bridge units 32, 34 and 36 comprise a relatively narrow transverse extension in the vestibular-palatinal/lingual direction. In the exemplary embodiment illustrated it amounts to less than the extension in the mesial-distal direction, but also to less than the extension in the occlusal-cervical direction. However, the exterior width of the bridge units 32, 36 (in turn as viewed from the vestibular direction) is not substantially smaller or even larger than the extension into both other dimensions; however, due to the voluminously dimensioned recesses 18, 20 and 22 the actual material thickness is substantially smaller.

Figure 3A:
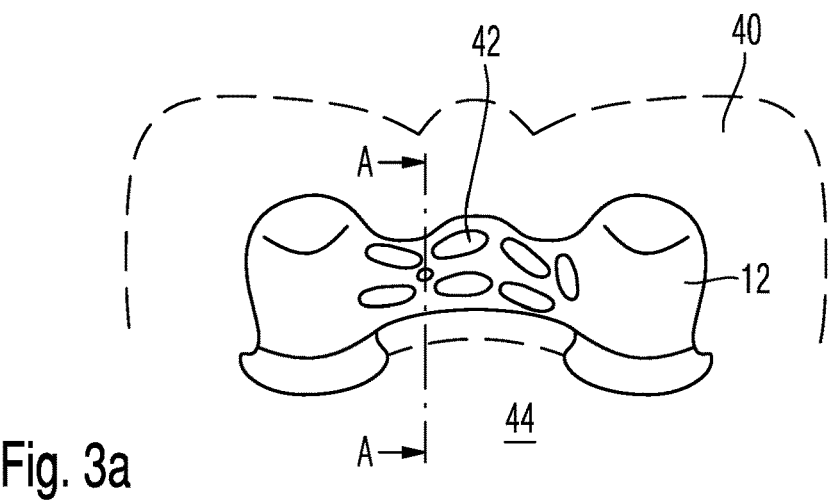
FIG. 3a shows a schematic side view of a modified embodiment of the inventive dental restoration.
Figure 3B:
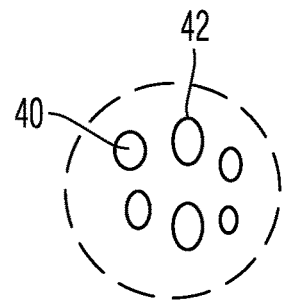

From FIG. 3a and FIG. 3b a further embodiment of the inventive dental restoration is apparent. Here, the veneer or the envelope ceramic material 40 is illustrated schematically. It also penetrates the plurality of recesses 42 which are provided in the ceramic support 12 located thereat. Here, the ceramic support 12 comprises a honeycomb structure, and the recesses are longitudinally oval in the vertical direction (that is to say as viewed cervically-occlusally), as can be seen from FIG. 3.

Preferably, the recesses 42 also extend three-dimensionally similar to an open-pored sponge, wherein this cannot be seen from FIG. 3a and FIG. 3b. In this exemplary embodiment, struts 44 are provided in any case which can also have a circular or longitudinally oval cross-section. When a longitudinally oval cross-section is selected, the main axis of the longitudinally oval cross section preferably extends also in the vertical direction.

Figure 4:
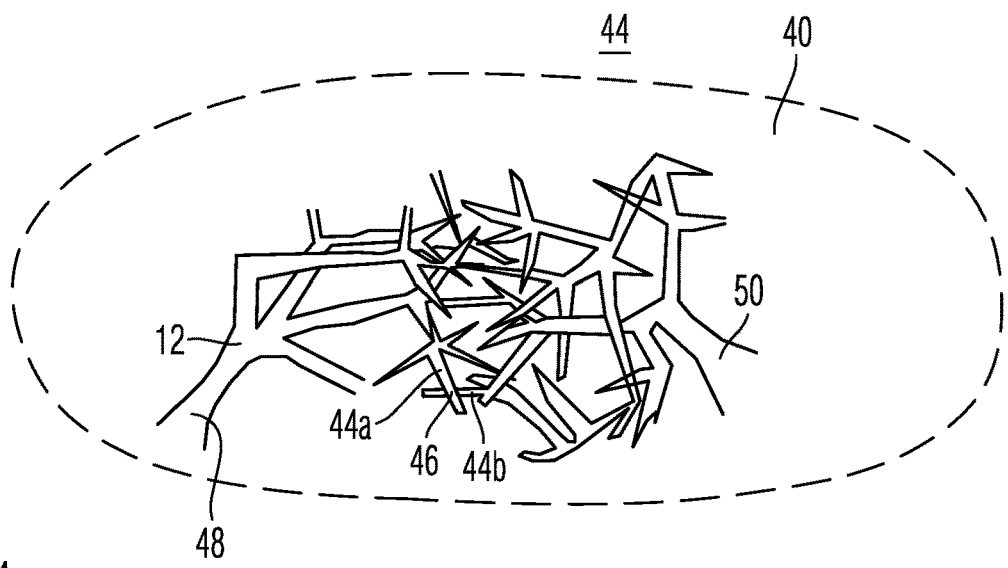
FIG. 4 shows a schematic view of a further embodiment of an inventive dental restoration.

From FIG. 4 a modified embodiment of an inventive ceramic support and the related veneer is apparent. Here, the net or frame structure is configured like a tree or is at least similar to a tree structure. Fine branches of the individual struts which cross one another are connected with adjacent points via the veneer 40 such that virtual knots 46 are produced which are provided plurally and which serve to support one another.

For this purpose, the struts 44a and 44b of the ceramic support 12 extend transversely to one another in space, but against one another such that they come close to one another at one position. Preferably, the struts 44a and 44b do not touch one another but remain at a distance of between 10 mm and 100 mm which is filled with filling ceramic material. The virtual knot 46 is formed by this approximation area.

It is to be understood that the trunks 48 and 50 of the tree structure are connected to receptacles for the abutment teeth, which are not shown in FIG. 4, in a way known per se and in the usual manner.

Figure 5:
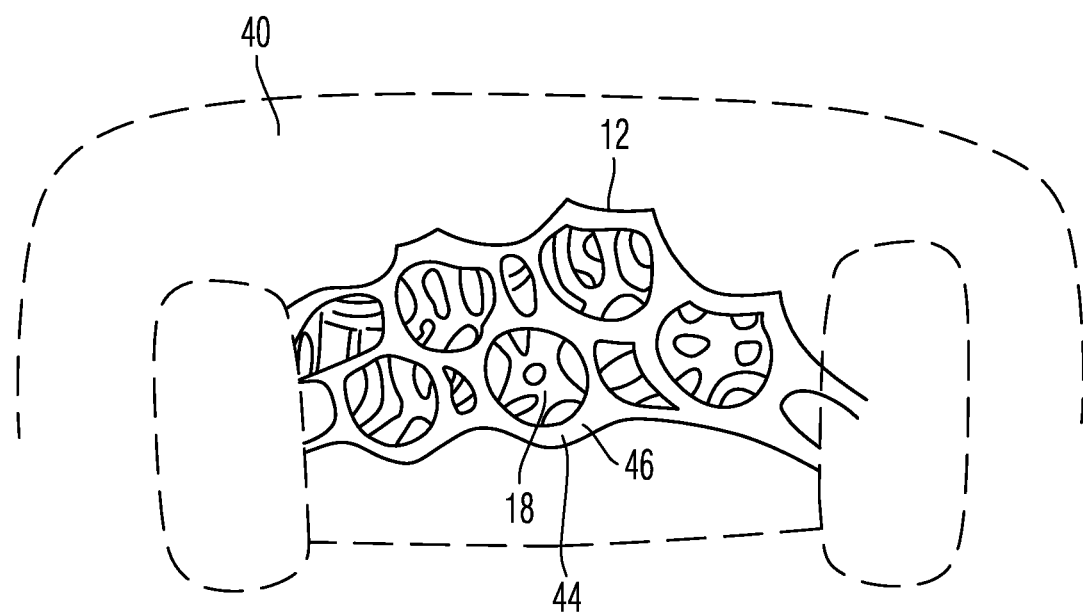
FIG. 5 shows a schematic view of a further embodiment of an inventive dental restoration.

From FIG. 5 a further three-dimensionally designed net or frame structure of the ceramic support 12 is apparent. This ceramic support consists of a three-dimensional frame with structures which engage one another, for instance of the type of hexahedrons, octahedrons or also cubes.

It is also possible to configure the recesses 18 similar to dense spherical packings and to design them by means of a computer such that the wall thickness of the struts 44 amounts constantly to about 100 mm each. In the area of the knots 46 a thickening to 200 mm takes place and at the transition between the strut 44 and the knot 46 the support structure is configured conically.

It is to be understood that in the realization of the support structure for instance by FEM, the possible masticatory forces can be involved and the support structure can be configured in a load-dependent manner appropriately.

The invention claimed is:

1. A dental restoration which comprises
a ceramic or metallic support which forms a support structure and
a veneer, wherein the veneer is produced by pressing a second ceramic material, which is more translucent than the support structure,
wherein the ceramic or metallic support is configured as a tree-like structure with branches, recesses formed between the branches, and the recesses filled with the veneer.

2. The dental restoration as claimed in claim 1, wherein the ceramic support is made by additive manufacturing from a curable mass comprising an oxide or glass ceramic material.

3. The dental restoration as claimed in claim 2, wherein CAD software, by which a mold is produced, sets or suggests interfaces between the oxide ceramic material and the veneer, and
wherein the interfaces are at least twice as large as a cross-sectional area of a tooth to be restored at an occlusal/incisal plane.

4. The dental restoration as claimed in claim 3, wherein the interfaces are at least three times as large as a cross-sectional area of a tooth to be restored at an occlusal/incisal plane.

5. The dental restoration as claimed in claim 3, wherein the interfaces are at least five times as large as a cross-sectional area of a tooth to be restored at an occlusal/incisal plane.

6. The dental restoration as claimed in claim 2, wherein the additive manufacturing comprises rapid prototyping and
wherein the ceramic material comprises a glass ceramic or composite material.

7. The dental restoration as claimed in claim 2, wherein the additive manufacturing comprises stereolithography,
wherein the curable mass comprises a photopolymerizable slurry which is debound and densely sintered in a thermal process.

8. The dental restoration as claimed in claim 1, wherein a strength of the completed dental restoration is higher than a combined strength of the support structure and the veneer separately.

9. The dental restoration as claimed in claim 1, wherein the support structure forms reinforcement ribs which extend at least partially between abutment teeth and which are configured to receive vertical loads.

10. The dental restoration as claimed in claim 1, wherein the branches of the support optionally extend transversely relative to a longitudinal extension of the dental restoration and which are positioned towards a cervical area of abutment teeth or to a stump thereof.

11. The dental restoration as claimed in claim 1, wherein the restoration is configured as a crown, optionally with an attachment, and comprises interdental connectors which extend at least partially obliquely relative to the longitudinal extension of the dental restoration, and are tilted towards a cervical area of abutment teeth.

12. The dental restoration as claimed in claim 1, wherein the support structure is configured such that the support structure at least partially surrounds a cavity and comprises a wall thickness of less than 4 mm.

13. The dental restoration as claimed in claim 12, wherein the support structure comprises a wall thickness of less than 1 mm.

14. The dental restoration as claimed in claim 1, wherein the veneer is produced from a positive model which is embedded in a muffle and burnt out,
wherein a produced cavity is filled to form the dental restoration.

15. The dental restoration as claimed in claim 1, wherein the support structure comprises fixation projections which are embedded into an embedding mass and predetermine a position of the support structure in a cavity produced in a muffle.

16. The dental restoration as claimed in claim 1, wherein the support structure comprises fixation projections and the veneer comprises matching notches which engage one another and which are configured on a non-labial side of the dental restoration.

17. The dental restoration as claimed in claim 1, wherein the branches extend between joints,
wherein at least one knot is connected to at least three branches, and
wherein the branches have a length of at least three times of a diameter at a place of a smallest diameter of a branch of the at least three branches.

18. The dental restoration as claimed in claim 17, wherein the at least three branches comprise an enlarged diameter positioned at the at least one knot compared with a diameter at a center of a branch of the at least three branches.

19. The dental restoration as claimed in claim 17, wherein the branches have a length of at least five times of the diameter at the place of the smallest diameter.

20. The dental restoration as claimed in claim 1, wherein the support structure is produced by pressing a green product made of a glass ceramic material into a cavity in a muffle, the cavity is provided by embedding a positive mold which has been produced by CAD design by means of additive manufacturing with aid of an embedding mass,
said glass ceramic material comprising a higher strength than the veneer, and
wherein the second ceramic material is a glass ceramic or composite material.

21. The dental restoration as claimed in claim 20, wherein the second ceramic material is glass ceramic material,
wherein the glass material for the support structure has a higher strength than the second ceramic material, and
wherein the second ceramic material is more translucent than the glass ceramic material of the support structure.

22. The dental restoration as claimed in claim 1, wherein the support structure is a metallic support structure which is produced by means of additive manufacturing selected from stereo lithography manufacturing of a model made of a material which is burnt out and subsequently embedded and cast as the metallic support structure, or Selective Laser Sintering, and
wherein then the metallic support structure is opaquerized before the second ceramic material is pressed through the recesses by a pressing process.

* * * * *